(12) United States Patent
Okamoto et al.

(10) Patent No.: US 8,214,908 B2
(45) Date of Patent: Jul. 3, 2012

(54) ELECTRONIC MUSICAL APPARATUS, CONTROL METHOD THEREFOR, AND PROGRAM FOR IMPLEMENTING THE CONTROL METHOD

(75) Inventors: Tetsuo Okamoto, Hamamatsu (JP); Tsutomu Yanase, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1018 days.

(21) Appl. No.: 11/086,529

(22) Filed: Mar. 21, 2005

(65) Prior Publication Data

US 2005/0209973 A1 Sep. 22, 2005

(30) Foreign Application Priority Data

Mar. 22, 2004 (JP) ................. 2004-083302

(51) Int. Cl.
 H04N 7/16 (2011.01)
 H04N 7/167 (2011.01)
 H04L 29/06 (2006.01)
 G06F 12/14 (2006.01)
 G06F 21/00 (2006.01)

(52) U.S. Cl. .......... 726/26; 713/165; 713/189; 380/201; 380/203; 380/237; 705/51; 705/57

(58) Field of Classification Search ............ 726/26; 713/165, 189; 380/201, 203, 237; 705/51, 705/57

See application file for complete search history.

(56) References Cited

U.S. PATENT DOCUMENTS

| | | | | |
|---|---|---|---|---|
| 6,128,391 A * | 10/2000 | Denno et al. | .......... | 380/283 |
| 7,239,701 B1 * | 7/2007 | Ogishi et al. | .......... | 380/44 |
| 7,463,737 B2 * | 12/2008 | Gillon et al. | .......... | 380/223 |
| 2002/0103759 A1 | 8/2002 | Matsumoto et al. | | |
| 2002/0150248 A1 * | 10/2002 | Kovacevic | .......... | 380/210 |
| 2003/0016829 A1 * | 1/2003 | Chu | .......... | 380/281 |
| 2003/0061477 A1 * | 3/2003 | Kahn et al. | .......... | 713/150 |
| 2003/0099354 A1 * | 5/2003 | Shavit et al. | .......... | 380/201 |
| 2003/0126455 A1 * | 7/2003 | Sako et al. | .......... | 713/193 |

(Continued)

FOREIGN PATENT DOCUMENTS

JP 2002-197069 A 7/2002

(Continued)

OTHER PUBLICATIONS

Notification of Reasons for Rejection mailed Jan. 12, 2010, for JP Application No. 2004-083302, with English translation, six pages.

(Continued)

Primary Examiner — Aravind Moorthy
(74) Attorney, Agent, or Firm — Morrison & Foerster LLP

(57) ABSTRACT

An automatic performance apparatus which can make it difficult to discriminate between music contents which require copyright protection and music contents which do not require copyright protection. An encrypted content file distributed by a contents distributing site via a network is received, and copyright protection information indicative of whether or not the received encrypted content file requires copyright protection is acquired. The received encrypted content file is decoded to generate a decoded content file. When the acquired copyright protection information indicates that copyright protection is required, a storage medium stores the encrypted content file, or a re-encrypted content file generated by re-encrypting the decoded content file by an encrypting method different from an encrypting method used to obtain the encrypted content file. On the other hand, when the acquired copyright protection information indicates that copyright protection is not required, the storage medium stores the decoded content file.

6 Claims, 5 Drawing Sheets

U.S. PATENT DOCUMENTS

2004/0025041 A1 2/2004 Kitamura et al.
2004/0159215 A1 8/2004 Tohgi et al.
2005/0076208 A1* 4/2005 Hori et al. .................... 713/165

FOREIGN PATENT DOCUMENTS

JP   2003-069734 A   3/2003
JP   2004-046452 A   2/2004

OTHER PUBLICATIONS

Notification of Reasons for Rejection mailed Jun. 1, 2011, for JP Application No. 2004-083302, (Demand for Trial Number Dissatisfaction 2010-28256), with English Translation, 47 pages.

Decision of Rejection mailed Sep. 14, 2010, for JP Application No. 2004-083302, with English Translation, four pages.

* cited by examiner

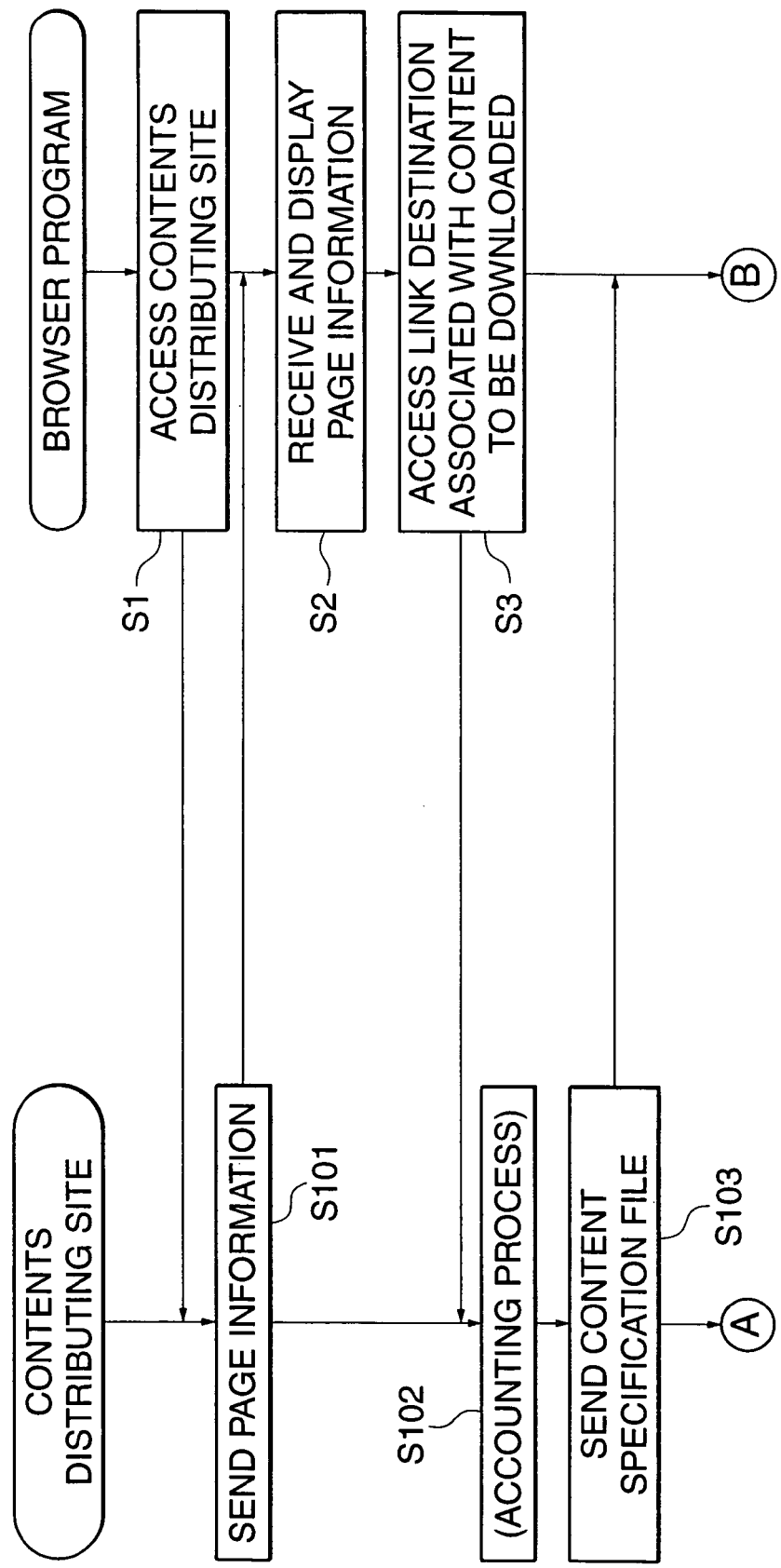

ELECTRONIC MUSICAL APPARATUS, CONTROL METHOD THEREFOR, AND PROGRAM FOR IMPLEMENTING THE CONTROL METHOD

BACKGROUND OF THE INVENTION

1. Field of the Invention

The present invention relates to an electronic musical apparatus which downloads music contents encrypted for copyright protection from a contents distributing site, a control method therefor, and a program for implementing the control method.

2. Description of the Related Art

Conventionally, there have been known electronic musical apparatuses which download music contents encrypted for copyright protection from a contents distributing site (refer to Japanese Patent Publication No. 3262121, for example).

Among music contents, there are those which do not require copyright protection (for example, free music contents intended for sales promotion). In the case where such music contents which do not require copyright protection are distributed, a contents distributing site distributes them without encryption, and hence the above conventional electronic musical apparatuses download unencrypted music contents. Thus, encrypted music contents and unencrypted music contents exist together on a network, and music contents which require copyright protection are always encrypted. Therefore, it has been possible to know which music contents are copyright-protected.

Also, to download a plurality of music contents, the above conventional electronic musical apparatuses need to designate music contents one by one and carry out downloading a plurality of times, which is very troublesome.

SUMMARY OF THE INVENTION

It is a first object of the present invention to provide an electronic musical apparatus and a control method therefor which can make it difficult to discriminate between music contents existing on a network which require copyright protection and music contents existing on the network which do not require copyright protection, and a program for implementing the method.

It is a second object of the present invention to provide an electronic musical apparatus and a control method therefor which can reduce the number of downloading in the case where a plurality of music contents are desired to be downloaded, and a program for implementing the method.

To attain the first object, in a first aspect of the present invention, there is provided an electronic musical apparatus comprising an encrypted musical content receiving device that receives a first encrypted music content distributed by a contents distributing site via a network, an acquiring device that acquires copyright protection information indicative of whether the first encrypted music content received by the encrypted musical content receiving device requires copyright protection, a decoding device that decodes the received first encrypted music content to generate a decoded music content, and a storage device operable when the copyright protection information acquired by the acquiring device indicates that copyright protection is required, to cause a storage medium to store the first encrypted music content, or a second encrypted content generated by encrypting the decoded music content generated by the decoding device by an encrypting method different from an encrypting method used to obtain the first encrypted music content, and operable when the acquired copyright protection information indicates that copyright protection is not required, to cause the storage medium to store the decoded music content generated by the decoding device.

According to the first aspect of the present invention, the first encrypted music content distributed from the contents distributing site via the network is received, and copyright protection information indicative of whether or not the received first encrypted music content requires copyright protection is acquired. When the acquired copyright protection information indicates that copyright protection is required, the first encrypted music content is stored in the storage medium, or the second encrypted music content generated by generating decoded music contents by decoding the first encrypted music content and then encrypting the decoded music content by an encryption method different from an encryption method used to obtain the first encrypted music content is stored in the storage medium. On the other hand, when the acquired copyright protection information indicates that copyright protection is not required, the decoded music content is stored in the storage medium. This makes it difficult to discriminate between music contents on a network which require copyright protection and music contents existing on the network which do not require copyright protection, and therefore improves the security of music contents.

To attain the second object, in a second aspect of the present invention, in the electronic musical apparatus according to the first aspect of the present invention, the first encrypted music content is packed with a plurality of content materials included therein, and the electronic musical apparatus further comprises an unpacking device that automatically unpacks the first encrypted music content when the acquired copyright protection information indicates that copyright protection is not required.

According to the second aspect of the present invention, the first encrypted music content is packed with a plurality of content materials included therein, and when the acquired copyright protection information indicates that copyright protection is not required, the first encrypted music content is automatically, unpacked. As a result, it is possible to reduce the number of times music contents are downloaded and make it unnecessary for an operator to carry out an unpacking process.

Preferably, the electronic musical apparatus further comprises a content specification file receiving device that receives a content specification file distributed by the contents distributing site via the network, and the encrypted music content receiving device receives the first encrypted music content read out from a storage location in a storage device within the contents distributing site indicated by storage location information written in the content specification file received by the content specification file receiving device, by the contents distributing site and distributed thereby.

More preferably, the copyright protection information is written in the content specification file, and the acquiring device acquires the copyright protection information on the received first encrypted music content from the received content specification file.

Preferably, the first encrypted music content is obtained by encryption using a common key shared by specific electronic music apparatuses.

More preferably, the second encrypted music content is obtained by encryption using a key unique to the electronic musical apparatus, or a key unique to the storage medium that is caused to store the second encrypted music content.

To attain the first object, in a third aspect of the present invention, there is provided a control method for an electronic musical apparatus, comprising an acquiring step of acquiring copyright protection information indicative of whether a first encrypted music content distributed by a contents distributing site via a network and received by an encrypted musical content receiving device requires copyright protection, a decoding step of decoding the received first encrypted music content to generate a decoded music content, and a storage step of causing a storage medium to store the first encrypted music content, or a second encrypted content generated by encrypting the decoded music content generated in the decoding step by an encrypting method different from an encrypting method used to obtain the first encrypted music content, when the copyright protection information acquired in the acquiring step indicates that copyright protection is required, and causing the storage medium to store the decoded music content generated in the decoding step when the acquired copyright protection information indicates that copyright protection is not required.

According to the third aspect of the present invention, the same effects as those obtained by the electronic musical apparatus according to the first aspect can be obtained.

Further, to attain the first object, in a fourth aspect of the present invention, there is provided a program for causing a computer to execute the control method according to the third aspect.

According to the fourth aspect of the present invention, the same effects as those obtained by the electronic musical apparatus according to the first aspect can be obtained.

The above and other objects, features, and advantages of the invention will become more apparent from the following detailed description taken in conjunction with the accompanying drawings.

BRIEF DESCRIPTION OF THE DRAWINGS

FIGS. 3A and 3B are flowcharts showing a control process carried out by the electronic musical apparatus in FIG. 1 and the contents distributing site;

DETAILED DESCRIPTION OF THE PREFERRED EMBODIMENTS

The present invention will now be described in detail with reference to the drawings showing a preferred embodiment thereof.

Figure 1:
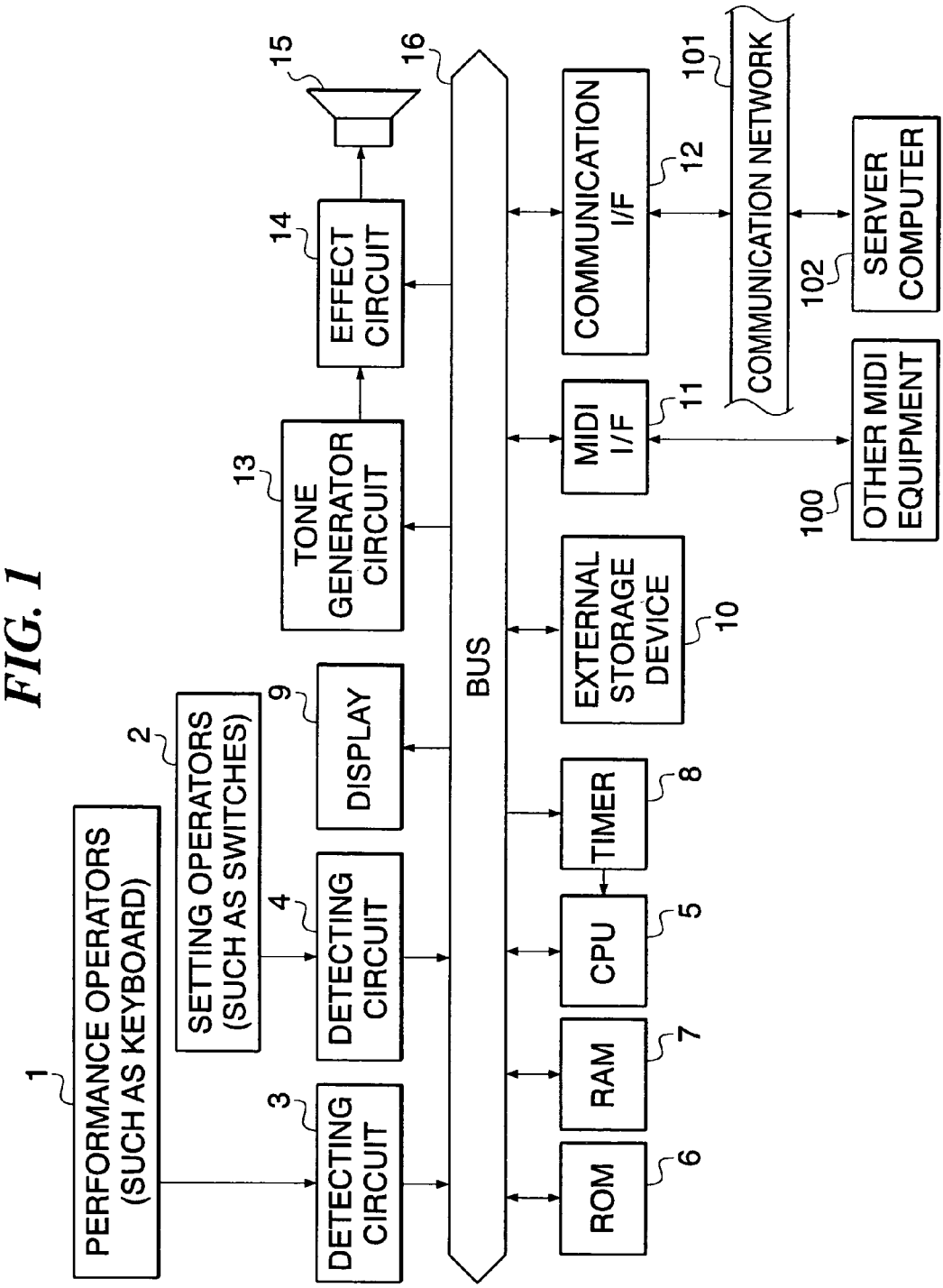
FIG. 1 is a block diagram schematically showing the construction of an electronic musical apparatus according to an embodiment of the present invention.

FIG. 1 is a block diagram schematically showing the construction of an electronic musical apparatus according to an embodiment of the present invention.

As shown in FIG. 1, the electronic musical apparatus according to the present embodiment is comprised of performance operators 1 including a musical keyboard for inputting pitch information, setting operators 2 including a plurality of switches, a numerical keyboard, and a mouse for inputting various kinds of information, a detecting circuit 3 for detecting operative states of the performance operators 1, a detecting circuit 4 for detecting operative states of the setting operators 2, a CPU 5 that controls the entire apparatus, a ROM 6 that stores control programs to be executed by the CPU 5, various table data, and so forth, a RAM 7 that temporarily stores performance data, various input information, computation results, and so forth, a timer 8 that measures various times such as an interrupt time for timer interrupt processing, a display 9 comprised of e.g. a liquid crystal display (LCD) or a CRT (Cathode Ray Tube), light emitting diodes (LEDs), and so forth, for displaying various kinds of information, an external storage device 10 that stores various application programs including the control programs, various musical composition data, and various other data, a MIDI interface (I/F) 11 that provides interface for inputting MIDI (Musical Instrument Digital Interface) messages from external devices and outputs MIDI messages to external devices, a communication interface (I/F) 12 that provides interface for sending and receiving data to and from e.g. a server computer (hereinafter simply referred to as "the server") 102 via a communication network 101, a tone generator circuit 13 that converts performance data input by the performance operators 1, preset performance data, and other data into musical tone signals, an effect circuit 14 that applies various effects to musical tone signals from the tone generator circuit 13, and a sound system 15 comprised of a DAC (Digital-to-Analog Converter), an amplifier, a speaker, and so forth, for converting musical tone signals from the effect circuit 14 into sounds.

The above component elements 3 to 14 are connected to each other via a bus 16. The timer 8 is connected to the CPU 5, other MIDI equipment 100 to the MIDI I/F 11, the communication network 101 to the communication I/F 12, the effect circuit 14 to the tone generator circuit 13, and the sound system 15 to the effect circuit 14. The communication I/F 12 and the communication network 101 should not necessarily be wired, but may be wireless, or one may be wired and the other may be wireless.

The external storage device 10 may be implemented, for example, by a flexible disk drive (FDD), a hard disk drive (HDD), a CD-ROM drive, or a magneto-optical disk (MO) drive. The external storage device 10 may store the control programs to be executed by the CPU 5 as mentioned above; if one or more control programs are not stored in the ROM 6, the control program(s) is (are) stored in the external storage device 10 and loaded into the RAM 7 so that the CPU 5 can operate in the same manner as in the case where the control program(s) is (are) stored in the ROM 6. This facilitates the addition of control programs, the version upgrade, and so forth.

The MIDI I/F 11 need not be a dedicated one, but may be implemented by a universal interface such as RS-232C, USB (Universal Serial Bus), or IEEE1394. In this case, data other than MIDI message data may be transmitted and received simultaneously via the MIDI I/F 11.

The communication I/F 12 is connected to the communication network 101 such as a LAN (Local Area Network), the Internet, or a telephone line as mentioned above, for connection to the server 102 via the communication network 101. When the above-mentioned programs and various parameters are not stored in the external storage device 10, the communication I/F 12 is used to provide interface for downloading such programs and parameters from the server 102. The electronic musical apparatus as a client sends a command or commands for downloading one or more programs and parameters to the server 102 via the communication I/F 12 and the communication network 101. In response to this command or commands, the server 102 distributes the requested program(s) and parameters to the electronic musical apparatus via the communication network 101, and the electronic musical apparatus receives the distributed program (s) and parameters via the communication I/F 12 and stores them in the external storage device 10, thus completing the download.

In the present embodiment, the server 102 is a web server in which a contents distributing site which distributes music contents (hereinafter simply referred to as "contents") is set up. The server 102 is comprised of the same component parts as those of the electronic musical apparatus according to the present embodiment, but the performance operators 1, detecting circuit 3, and MIDI I/F 11 may be omitted because they are not indispensable. In general, a server computer is used as the server 102. It should be noted that the server 102 can be equated with a contents distributing site, and hence the server 102 will hereinafter be referred to as the contents distributing site 102.

Figure 2:
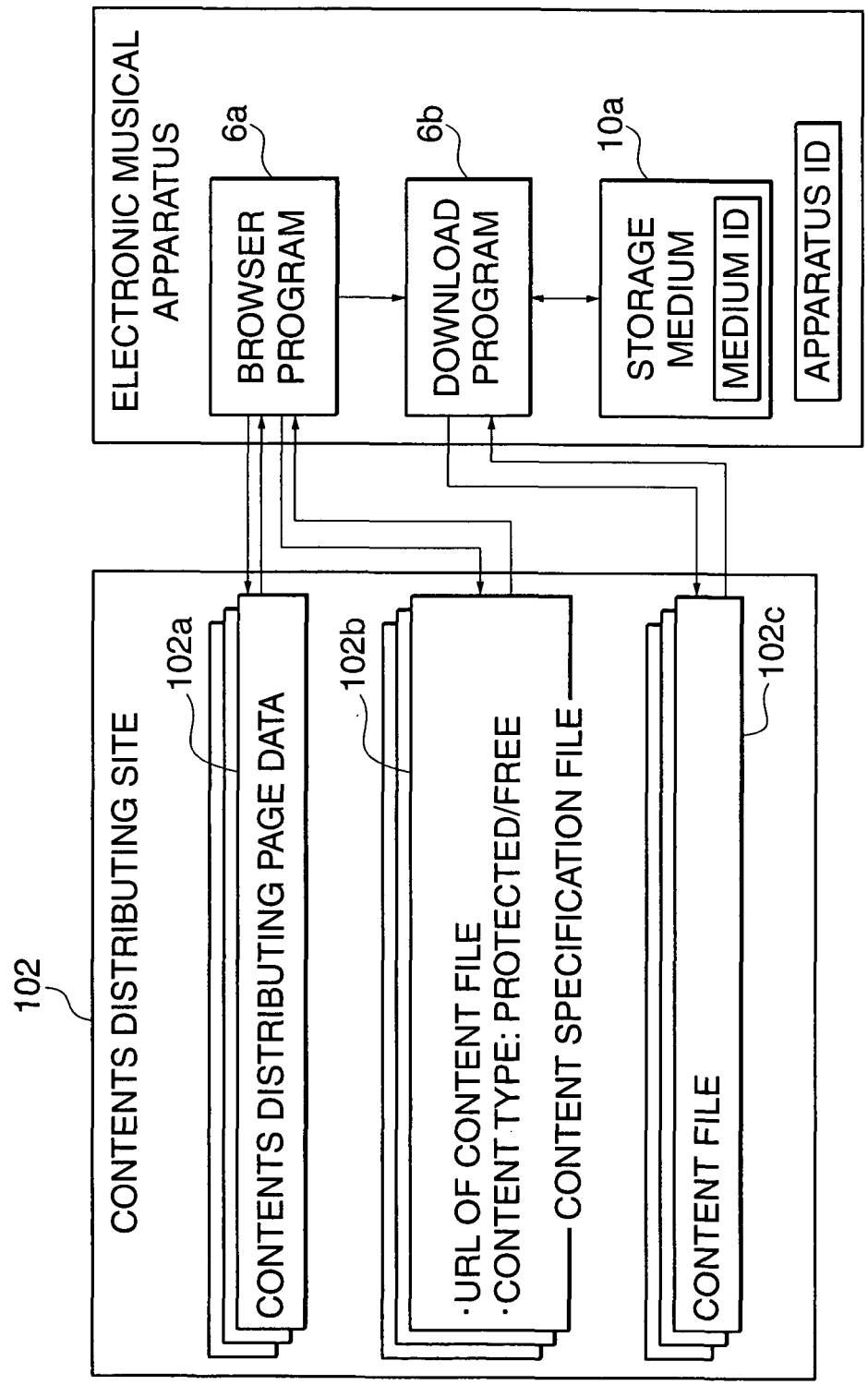
FIG. 2 is a block diagram schematically showing the functional configurations of the electronic musical apparatus in FIG. 1 and a contents distributing site.

FIG. 2 is a block diagram schematically showing the functional configurations of the electronic music apparatus according to the present embodiment and the contents distributing site 102.

Figure 3B:
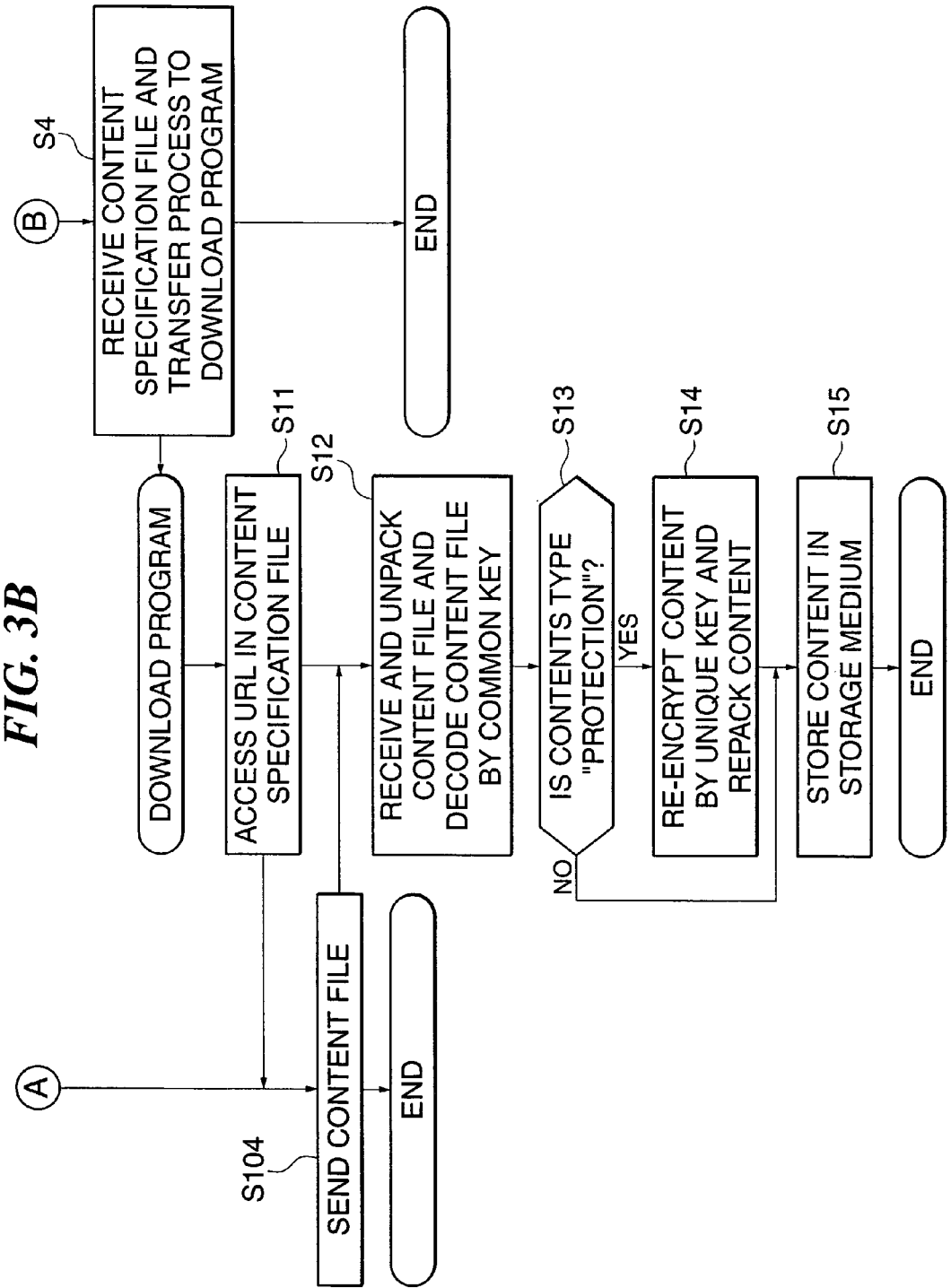

As shown in FIG. 2, the electronic musical apparatus according to the present embodiment is comprised of a browser program 6a that is operable to acquire contents distributing page data 102a stored in e.g. an external storage device, not shown, of the contents distributing site 102 and cause the display 9 to display a contents distributing page based on the acquired contents distributing page data 102a, a download program 6b that is operable to download a content file 102c at a location indicated by a content file URL (Uniform Resource Locators), which is written in a content specification file 102b associated with a content designated by an operator (the content specification file 102b is also stored in e.g. the above-mentioned external storage device and acquired by the browser program 6a) on the contents distributing page displayed by the browser program 6a from the contents distributing site 102, and perform processing on the downloaded content file 102c according to a content type (information indicative of whether or not copyright protection is required) written in the content specification file 102b (the contents of this processing will be described later with reference to FIGS. 3A and 3B), and a storage medium 10a that stores the content file 102c processed by the download program 6b.

The browser program 6a and the download program 6b are stored in e.g. the external storage device 10, and loaded into the RAM 7 when they are used. The storage medium 10a is part of the external storage device 10 and is removable from the external storage device 10. The storage medium 10a is provided with a medium ID unique thereto. Also, the electronic musical apparatus according to the present embodiment is provided with an apparatus ID unique thereto. It should be noted that the medium ID and the apparatus ID are used to re-encrypt a decoded content as described later, and hence in the case where only one of the medium ID and the apparatus ID is used for re-encryption of the decoded content, the other ID need not be given to the storage medium 10a or the electronic musical apparatus.

The contents distributing site 102 stores, in the above-mentioned external storage device, plural pieces of the contents distributing page data 102a, the content specification files 102b associated with (linked to) icons or titles provided for a plurality of contents displayed on each contents distributing page displayed based on each piece of the contents distributing page data 102a, and the content files 102c at respective locations indicated by content file URLs written in the respective content specification files 102b. It should be noted that the contents distributing page data 102a may be statically (fixedly) created by an operator who operates the contents distributing site 102, or may be dynamically created by the CPU, not shown, of the contents distributing site 102 according to some sort of information sent from the download program 6b. Also, after the operator creates a layout or the like, titles of contents to be displayed and others may be created by the above-mentioned CPU.

As will be understood from the above described construction, the electronic musical apparatus according to the present embodiment is constructed on an electronic musical instrument.

In the case where the electronic musical apparatus is implemented by an electronic musical instrument, the electronic musical instrument should not necessarily be a keyboard musical instrument, but may be a stringed instrument, a wind instrument, a percussion instrument, or the like. Further, a tone generator apparatus, an electronic musical apparatus, and so forth should not necessarily be incorporated into an electronic musical instrument, but may be configured as separate bodies and connected to each other via communication means such as a MIDI I/F and various kinds of networks.

Further, the electronic musical apparatus according to the present embodiment may be constructed on a dedicated apparatus, other than an electronic musical instrument, comprised of minimum elements which can realize the present invention. Examples of the dedicated apparatus include a karaoke machine, a game machine, and a portable communication terminal such as a cellular phone. In the case where the present invention is applied to a portable communication terminal, it should not necessarily be configured such that predetermined functions are completed by only the terminal, but part of the functions may be assigned to a server so that a system comprised of the terminal and the server can realize the functions of the present invention. Alternatively, the electronic musical apparatus according to the present embodiment may be constructed on a general-purpose personal computer.

Referring next to FIGS. 3A to 4B, a detailed description will be given of a control process carried out by the electronic musical apparatus constructed in the above-mentioned manner and the contents distributing site 102.

Figure 4A:
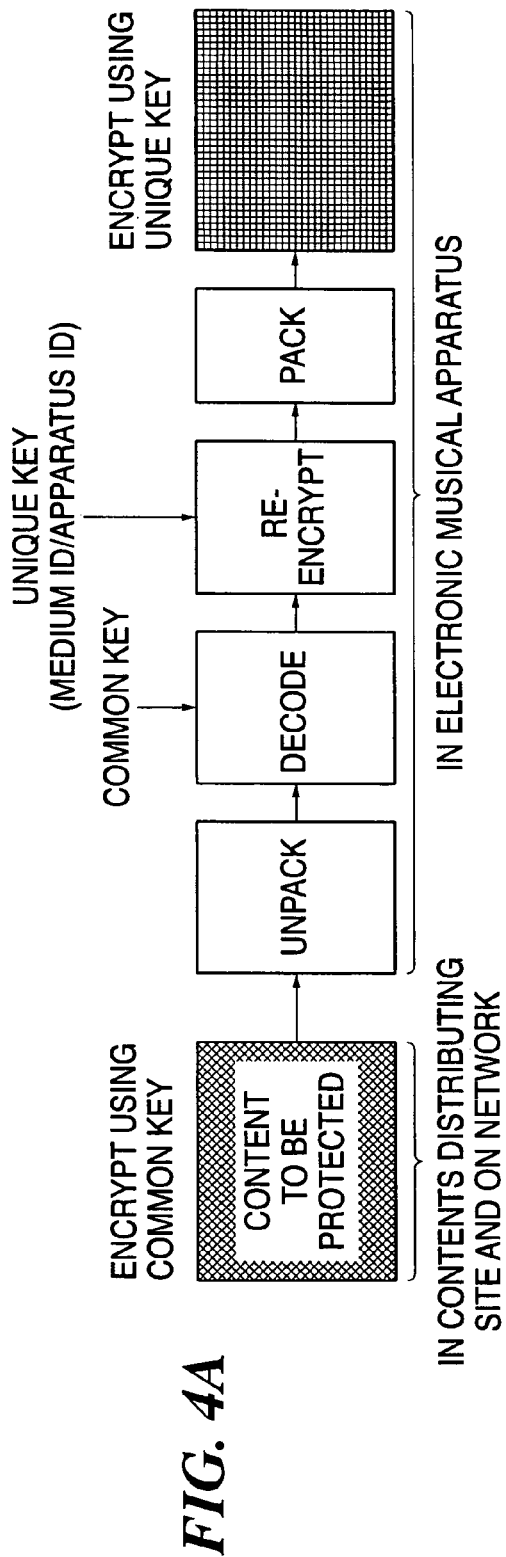
FIG. 4A is a diagram visually showing a process carried out on a content, which requires copyright protection, by the electronic musical apparatus in FIG. 1.
Figure 4B:
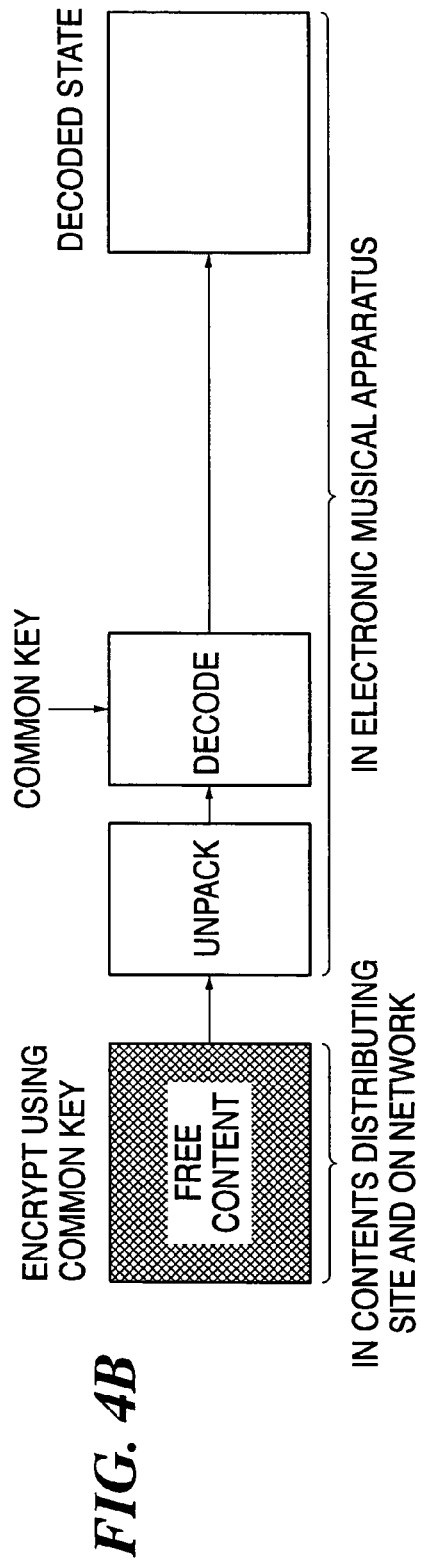
FIG. 4B is a diagram visually showing a process carried out on a content, which does not require copyright protection, by the electronic musical apparatus in FIG. 1.

FIGS. 3A and 3B are flowcharts showing the control process carried out by the electronic musical apparatus according to the present embodiment (the browser program 6a and the download program 6b) and the contents distributing site 102. FIGS. 4A and 4B are diagrams visually showing part of the control process carried out by the electronic musical apparatus according to the present embodiment, and in particular, part of the control process carried out in accordance with the download program 6b.

As shown in FIGS. 3A and 3B, when an operator who operates the electronic musical apparatus according to the present embodiment (in the present embodiment, an operator who operates the contents distributing site 102 need not be taken into consideration, and hence in the following description, the operator always denotes an operator who operates the electronic musical apparatus according to the present embodiment; the words "who operates electronic musical apparatus according to the present embodiment" after the word "operator" are omitted) instructs activation of the browser program 6a, the browser program 6a is activated to, first, access the contents distributing site 102 in response to an instruction from the operator (step S1).

Responsive to this access, the contents distributing site 102 sends the contents distributing page data 102a according to an instruction from the operator to the browser program 6*a* via the communication network 101 (step S101).

The browser program 6*a* receives the sent contents distributing page data 102*a* and displays the same on the display 9 (step S2). As mentioned above, icons or titles corresponding to respective ones of a plurality of contents are displayed on the displayed contents distributing page. When the operator designates an icon or title associated with a content desired to be downloaded, the browser program 6*a* accesses a link destination in the contents distributing site 102, which is associated with the designated icon or title (step S3).

For example, accounting information on the content designated to be downloaded and storage location information (URL) on the content specification file 102*b* are written in the link destination. The contents distributing site 102 carries out an accounting process (step S102) according to the accounting information, reads out the content specification file 102*b* at a location in a storage device within the contents distributing site 102 indicated by the storage location information, and sends the readout content specification file 102*b* to the browser program 6*a* (step S103). Examples of the accounting process include a process in which the fee of the designated content is withdrawn from an account owned by the operator, and a process in which the fee is charged to a credit company with which the operator establishes an account. It should be noted that the content designated to be downloaded may be free of charge, and in this case, the accounting process is not carried out.

Immediately upon receiving the content specification file 102*b*, the browser program 6*a* transfers the process to the download program 6*b* (step S4). Responsive to this, the download program 6*b* is activated to, first, access a content file URL written in the content specification file 102*b* (step S11).

In response to this access, the contents distributing site 102 reads out the content file 102*c* indicated by the URL and sends the same to the download program 6*b* (step S104).

In the present embodiment, it is assumed that the content file 102*c* includes a plurality of content materials. As examples of a content including a plurality of content materials, those which require copyright protection include a rich compound content including different kinds of content materials such as "automatic performance data comprised of a plurality of MIDI messages"+"image data used for displaying the automatic performance data as a musical score"+ "audio data generated by recording an audio signal by e.g. PCM (Pulse Code Modulation) recording format", and those which do not require copyright protection include a content including a plurality of the same kind of content materials such as a "free MIDI data collection". Individually downloading a plurality of content materials forces the operator to bear the burden of carrying out troublesome operations as is the case with the above conventional electronic musical apparatus, and to solve this problem, the content file 102*c* is a packed file, that is, a plurality of content materials thereof are packed into a single file so that they can be handled as a single file. Therefore, the operator can download a plurality of content materials in one operation, which dramatically improves user friendliness.

Further, the single file is encrypted using a common key (which is not dependent on individual electronic musical apparatuses and storage media and is not publicly known, but is used commonly by specific electronic musical apparatuses; e.g. a key which is known only to the electronic musical apparatus according to the present embodiment). One of the features of the present invention is that the content file 102*c* is encrypted using a common key irrespective of whether or not the content file 102*c* requires copyright protection. This makes it difficult to discriminate between music contents on a network which require copyright protection and music contents existing on the network which do not require copyright protection, and therefore improves the security of the contents.

Although in the present embodiment, it is assumed that the content file 102*c* is stored after the content materials are packed and the resulting file is encrypted using a common key, the present invention is not limited to this, but it may be arranged such that the content file 102*c* is stored before the content materials are packed and the resulting file is encrypted using a common key, and then the file is read out, encrypted using the common key and sent to the download program 6*b*.

The download program 6*b* receives the sent content file 102*c*. The subsequent processing in steps S12 to S14 will be explained with reference to FIGS. 4A and 4B as well as FIGS. 3A and 3B because they are visually shown in FIGS. 4A and 4B.

The processing in the steps S12 to S14 involves the following two kinds of processing: processing performed on (1) a content which requires copyright protection (hereinafter referred to as "content to be protected") (this processing will hereinafter be referred to as "the protected content processing") as shown in FIG. 4A, and (2) a content which does not require copyright protection (hereinafter referred to as "free content") (this processing will hereinafter be referred to as "the free content processing") as shown in FIG. 4B.

As described earlier, the content file 102*c* is subjected to the packing and the encryption using a common key irrespective of whether the content file 102*c* contains a content to be protected or a free content. Thus, first, the received content file 102*c* is unpacked and decoded using a common key irrespective of whether the protected content processing (1) and the free content processing (2) is to be performed (step S12).

Next, whether the decoded content file 102*c* contains a content to be protected or a free content is determined by referring to a content type written in the received content specification file 102*b*. If the decoded content file 102*c* contains a content to be protected, the process proceeds to the protected content processing (1), in which the content file 102*c* is re-encrypted using a unique key (a key which is generated by using the above-mentioned apparatus ID or medium ID as it is, or by processing the same) and then the contents materials thereof are packed (step S14). On the other hand, if the decoded content file 102*c* contains a free content, nothing is done.

Then, if the decoded content file 102*c* contains a content to be protected, the content file 102*c* which has been subjected to the re-encryption and the repacking by the protected content processing (1) is stored in the storage medium 10*a*. On the other hand, if the decoded content file 102*c* contains a free content, the decoded content file 102*c* is stored as it is in the storage medium 10*a*.

In the case where a content stored in the storage medium 10*a* is used, if the content is a content to be protected, it must be used after being decoded using a unique key used for re-encryption. If the unique key is based on the apparatus ID, a content to be protected which was re-encrypted using the unique key cannot be used by other electronic musical apparatuses even if it is stored in the removable storage medium 10*a*, because the apparatus ID is unique to the associated electronic musical apparatus.

On the other hand, if the unique key is based on the medium ID, a content to be protected which was re-encrypted using the unique key can be used by other electronic musical apparatuses if the storage medium 10a is directly attached to them, because the medium ID is unique to the associated storage medium. However, in the case where the content to be protected is copied to another storage medium, the copied content cannot be used by any electronic musical apparatuses. It should be noted that the re-encryption is carried out based on information which can be interpreted by the electronic musical apparatus according to the present embodiment, and hence the re-encrypted contents can be used on the electronic musical apparatus according to the present embodiment without large limitations insofar as they are not used in an especially unique way. However, there may be a case where even on the electronic musical apparatus according to the present embodiment, a limitation is desired to be imposed upon a content to be protected. In this case, limiting conditions are written in the content file 102c, so that a limitation can be imposed upon the usage of a content to be protected according to the limiting conditions. Examples of the imitating conditions include limitations imposed upon the number of copies and the number of editions.

On the other hand, if the content stored in the storage medium 10a is a free content, the content can be freely used as it is without any limitations mentioned above.

It should be noted that in the present embodiment, a plurality of content materials are packed after they are individually encrypted, but this sequence may be reversed such that the content materials are packed and then individually encrypted. In this case, when decoding the encrypted content, it must be decoded and then unpacked, which is reverse in sequence to the examples shown in FIGS. 4A and 4B.

Further, although in the present embodiment, when re-encrypting a content to be protected, it is re-encrypted using an encrypt key (unique key) different from the original encrypt key (common key), the present invention is not limited to this, but a content to be protected may be re-encrypted using the same key as the original encrypt key. Also, irrespective of whether encrypt keys are the same or different, the original encryption method may be different from an encryption method used for re-encryption. Further, the encrypt keys are not limited to those described above.

Further, it may be arranged such that if a content which has been downloaded is a content to be protected, it is stored as it is, and if the content is a free content, it is unpacked and decoded.

Further, although in the present embodiment, information indicative of whether a content is a content to be protected or a free content is written in a content specification file different from the content file, the present invention is not limited to this, but the information may be written at a predetermined location within the content file. In this case, after the encrypted content file is decoded, the information is read out from the content file, and then whether the content is a content to be protected or a free content is determined according to the information.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading from a server computer via a communication network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An electronic musical apparatus comprising:
an encrypted musical content receiving device that receives a first encrypted music content packed with a plurality of content materials included therein and distributed by a contents distributing site via a network;
an acquiring device that acquires copyright protection information indicative of whether the first encrypted music content received by said encrypted musical content receiving device requires copyright protection;
a decoding device that unpacks and decodes the received first encrypted music content to generate a plurality of decoded music contents; and
a storage device operable when the copyright protection information acquired by said acquiring device indicates that copyright protection is required, to cause a storage medium to store a second encrypted content generated by re-encrypting the decoded music content generated by said decoding device by an encrypting method different from an encrypting method used to obtain the first encrypted music content and re-packing the plurality of re-encrypted decoded music contents, and operable when the acquired copyright protection information indicates that copyright protection is not required, to cause the storage medium to store the plurality of decoded music contents generated by said decoding device.

2. An electronic musical apparatus according to claim 1, further comprising a content specification file receiving device that receives a content specification file distributed by the contents distributing site via the network, and
wherein said encrypted music content receiving device receives the first encrypted music content read out from a storage location in a storage device within the contents distributing site indicated by storage location information written in the content specification file received by said content specification file receiving device, by the contents distributing site and distributed thereby.

3. An electronic musical apparatus according to claim 2, wherein the copyright protection information is written in the content specification file, and said acquiring device acquires the copyright protection information on the received first encrypted music content from the received content specification file.

4. An electronic-musical apparatus according to claim 1, wherein the first encrypted music content is obtained by encryption using a common key shared by specific electronic music apparatuses.

5. An electronic musical apparatus according to claim 1, wherein the second encrypted music content is obtained by encryption using a key unique to the electronic musical apparatus, or a key unique to the storage medium that is caused to store the second encrypted music content.

6. A non-transitory computer-readable storage medium storing a program for causing a computer to execute a control method for an electronic musical apparatus, the control method comprising:

an acquiring step of acquiring copyright protection information indicative of whether a first encrypted music content distributed by a contents distributing site via a network and received by an encrypted musical content receiving device requires copyright protection, the first encrypted music content packed with a plurality of content materials included therein;

a decoding step of decoding the received first encrypted music content to generate a plurality of decoded music contents; and a storage step of causing a storage medium to store a second encrypted content generated by re-encrypting the decoded music content generated in said decoding step by an encrypting method different from an encrypting method used to obtain the first encrypted music content and re-pack the plurality of re-encrypted decoded music contents, when the copyright protection information acquired in said acquiring step indicates that copyright protection is required, and causing the storage medium to store the plurality of decoded music contents generated in said decoding step when the acquired copyright protection information indicates that copyright protection is not required.

* * * * *